(12) United States Patent
Grossman et al.

(10) Patent No.: US 10,082,953 B2
(45) Date of Patent: Sep. 25, 2018

(54) TECHNIQUES FOR INTERACTING WITH WEARABLE DEVICES

(71) Applicant: AUTODESK, Inc., San Rafael, CA (US)

(72) Inventors: Tovi Grossman, Toronto (CA); Xiang Anthony Chen, Pittsburgh, PA (US); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 220 days.

(21) Appl. No.: 14/832,983

(22) Filed: Aug. 21, 2015

(65) Prior Publication Data
US 2017/0052700 A1 Feb. 23, 2017

(51) Int. Cl.
  *G06F 3/0488* (2013.01)
  *G06F 3/041* (2006.01)
  *G06F 3/01* (2006.01)

(52) U.S. Cl.
  CPC .......... *G06F 3/04886* (2013.01); *G06F 3/016* (2013.01); *G06F 3/041* (2013.01)

(58) Field of Classification Search
  CPC .......... G06F 3/011; G06F 3/016; G06F 3/017; G06F 3/041; G06F 3/0416; G06F 3/048; G06F 3/0481; G06F 3/04817; G06F 3/0482; G06F 3/0484; G06F 3/04842
  See application file for complete search history.

(56) References Cited

U.S. PATENT DOCUMENTS

| | | | | |
|---|---|---|---|---|
| 8,823,603 | B1* | 9/2014 | Kim | G06F 3/016 345/156 |
| 9,292,082 | B1* | 3/2016 | Patel | G06F 3/011 |
| 2010/0313168 | A1* | 12/2010 | Wiest | G06F 3/0236 715/830 |
| 2015/0103021 | A1* | 4/2015 | Lim | G06F 3/017 345/173 |

(Continued)

OTHER PUBLICATIONS

Amma, C., Georgi, M., & Schultz, T. Airwriting: Hands-free mobile text input by spotting and continuous recognition of 3D-space handwriting with inertial sensors, ISWC '12. 52-59.

(Continued)

*Primary Examiner* — Nathan Danielsen
(74) *Attorney, Agent, or Firm* — Artegis Law Group, LLP (57) ABSTRACT

In one embodiment of the present invention, a gesture recognition application enables interactive entry via a touch pad. In operation, the gesture recognition application partitions the touch pad into multiple zones. Upon detecting a gesture via the touch pad, the gesture recognition application determines whether the gesture is zone-specific. If the gesture is zone-specific, then the gesture recognition application determines the zone based on the location of the gesture and then selects an input group based on the zone and the type of gesture. If the gesture is zone-agnostic, then the gesture recognition application selects an input group based on the type of gesture, irrespective of the location of the gesture. Advantageously, by providing zone-specific gesture recognition, the gesture recognition application increases the usability of touch pads with form factors that limit the type of gestures that can be efficiently performed via the touch pad.

20 Claims, 5 Drawing Sheets

(56) References Cited

U.S. PATENT DOCUMENTS

2015/0293604 A1* 10/2015 Fernandez ............ G06F 3/0219
345/169

OTHER PUBLICATIONS

Blasko, G. and Feiner, S. Evaluation of an Eyes-Free Cursorless Numeric Entry System for Wearable Computers. Wearable Computers, (2006), 21-28.
Bederson, B. B., Hollan, J. D., Perlin, K., Meyer, J., Bacon, D., & Furnas, G. Pad++: A zoomable graphical sketchpad for exploring alternate interface physics. JVLC. 1996, 7(1), 3-32.
Castellucci, S. J., & MacKenzie, I. S. Graffiti vs. unistrokes : an empirical comparison. CHI '08. 305-308.
Chen, X. A., Grossman, T., & Fitzmaurice, G. Swipeboard: A Text Entry Technique for Ultra-Small Interfaces That Supports Novice to Expert Transitions. To appear UIST '14.
Isokoski, P. Text input methods for eye trackers using off-screen targets. ETRA '00. 15-21.
Kim, S., Sohn, M., Pak, J., & Lee, W. One-key keyboard: a very small QWERTY keyboard supporting text entry for wearable computing. OzCHI '06. 305-308.
Kristensson, P. O., & Zhai, S. Shark 2: a large vocabulary shorthand writing system for pen-based computers. UIST '04. 43-52.
Kurtenbach, G., & Buxton, W. User learning and performance with marking menus. CHI '94. 258-264.
Li, F. C. Y., Guy, R. T., Yatani, K., & Truong, K. N. The 1line keyboard: a QWERTY layout in a single line. UIST '11. 461-470.
Liu, Y., Liu, X., & Jia, Y. Hand-gesture based text input for wearable computers. ICVS '06. 8-14.
Lyons, K., Starner, T., Plaisted, D., Fusia, J., Lyons, A., Drew, A., & Looney, E. W. Twiddler typing: One-handed chording text entry for mobile phones. CHI '04. 671-678.
MacKenzie, S. Mobile text entry using three keys. CHI '02. 27-34.
MacKenzie, I. S., & Soukoreff, R. W. Phrase sets for evaluating text entry techniques. CHI '03 EA. 754-755.
MacKenzie, I. S., Soukoreff, R. W., & Helga, J. 1 thumb, 4 buttons, 20 words per minute: Design and evaluation of H4-Writer. UIST '11. 471-480.
Ni, T., & Baudisch, P. Disappearing mobile devices. UIST '09. 101-110.
Oney, S., Harrison, C., Ogan, A., & Wiese, J . . . ZoomBoard: a diminutive QWERTY soft keyboard using iterative zooming for ultra-small devices. CHI '13. 2799-2802.
Partridge, K., Chatterjee, S., Sazawal, V., Borriello, G., & Want, R. TiltType: accelerometer-supported text entry for very small devices. UIST '02. 201-204.
Perlin, K. Quikwriting: continuous stylus-based text entry. UIST'98. 215-216.
Rico, J., & Brewster, S. Usable gestures for mobile interfaces. CHI'10. 887-896.
Rosenberg, R., & Slater, M. The chording glove: a glove-based text input device. ToSMC. 1999, 29(2), 186-191.
Ward, D. J., Blackwell, A. F., & MacKay, D. J. Dasher—a data entry interface using continuous gestures and language models. UIST '00. 129-137.
Wigdor, D., & Balakrishnan, R. TiltText: using tilt for text input to mobile phones. CHI '03. 81-90.
Wigdor, D., & Balakrishnan, R. A comparison of consecutive and concurrent input text entry techniques for mobile phones. CHI '04. 81-88.
Wobbrock, J.O., Fogarty, J., Liu, S.-Y.S., Kimuro, S., and Harada, S. The angle mouse: target-agnostic dynamic gain adjustment based on angular deviation. CHI '09, 1401-1410.
Wobbrock, J. O., Myers, B. A., & Kembel, J. A. EdgeWrite: a stylus-based text entry method designed for high accuracy and stability of motion. UIST '03. 61-70.
Zhao, S., Agrawala, M., & Hinckley, K. Zone and polygon menus: using relative position to increase the breadth of multi-stroke marking menus. CHI '06. 1077-1086.
Zhao, S., & Balakrishnan, R. Simple vs. compound mark hierarchical marking menus. UIST '04. 33-42.

* cited by examiner

TECHNIQUES FOR INTERACTING WITH WEARABLE DEVICES

BACKGROUND OF THE INVENTION

Field of the Invention

Embodiments of the present invention relate generally to computer processing and, more specifically, to techniques for interacting with wearable devices.

Description of the Related Art

Wearable devices, such as smart eyewear and heads-up displays, are designed to enable unobtrusive, constant, and immediate access to information. In general, wearable devices have small form factors that satisfy a variety of consumer requirements pertaining to comfort, aesthetics, and so forth. However, the small form factors typically limit the types of user-friendly interactions that the wearable devices support.

One approach to circumventing the limitations imposed by the small form factor uses supplementary devices in conjunction with the wearable devices. For example, a one-handed keyboard can be configured to wirelessly communicate with smart eyewear. However, relying on such supplementary devices undermines one of the primary advantages of wearable devices—unobtrusive access to information without the inconvenience associated with carrying or tethering to any device.

Another approach to bypassing the limitations imposed by the small form factor employs voice-recognition techniques. However, while voice input may be useful in some situations, in other situations voice input is not an acceptable input mechanism. For example, in various situations, people often find a need or desire to relay private information to wearable devices while in the presence of others.

Yet another approach to interacting with wearable devices leverages existing touch pads included in the wearable devices to enable limited tactile interactions that can be reliably supported despite the small form factor. For example, through a series of gestures, input can be conveyed to smart eyewear via a side touch pad. However, because the size of the touch pads included in wearable devices is limited, many common input tasks, such as text entry, are challenging. For example, placing a standard QWERTY keyboard on the touch pad in a manner that enables access to all of the characters is usually impractical.

As the foregoing illustrates, what is needed in the art are more effective techniques for interacting with wearable devices.

SUMMARY OF THE INVENTION

One embodiment of the present invention sets forth a computer-implemented method for interacting with a wearable device. The method includes partitioning a touch pad associated with the wearable device into multiple zones; detecting a first gesture performed via the touch pad; in response, determining whether a first gesture type associated with the first gesture is zone-specific; and if the first gesture type is zone-specific, then: identifying a first zone included in the multiple zones based on a first location associated with the first gesture, and setting a selected input group to equal a first input group included in multiple input groups based the first zone and the first gesture type; or if the first type is not zone-specific, then setting the selected input group to equal a second input group included in the multiple input groups based on the first gesture type.

One advantage of the disclosed approach is that partitioning the side touch pad into multiple entry zones leverages the relatively wider dimension of the side touch pad to enable efficient gesture-based text entry for smart eyewear. Notably, by exploiting the side touch pads to provide unobtrusive, constant access to information, the disclosed techniques enable effective interaction with smart eyewear without compromising the design goals of the smart eyewear.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Smart Eyewear System Overview

Figure 1:
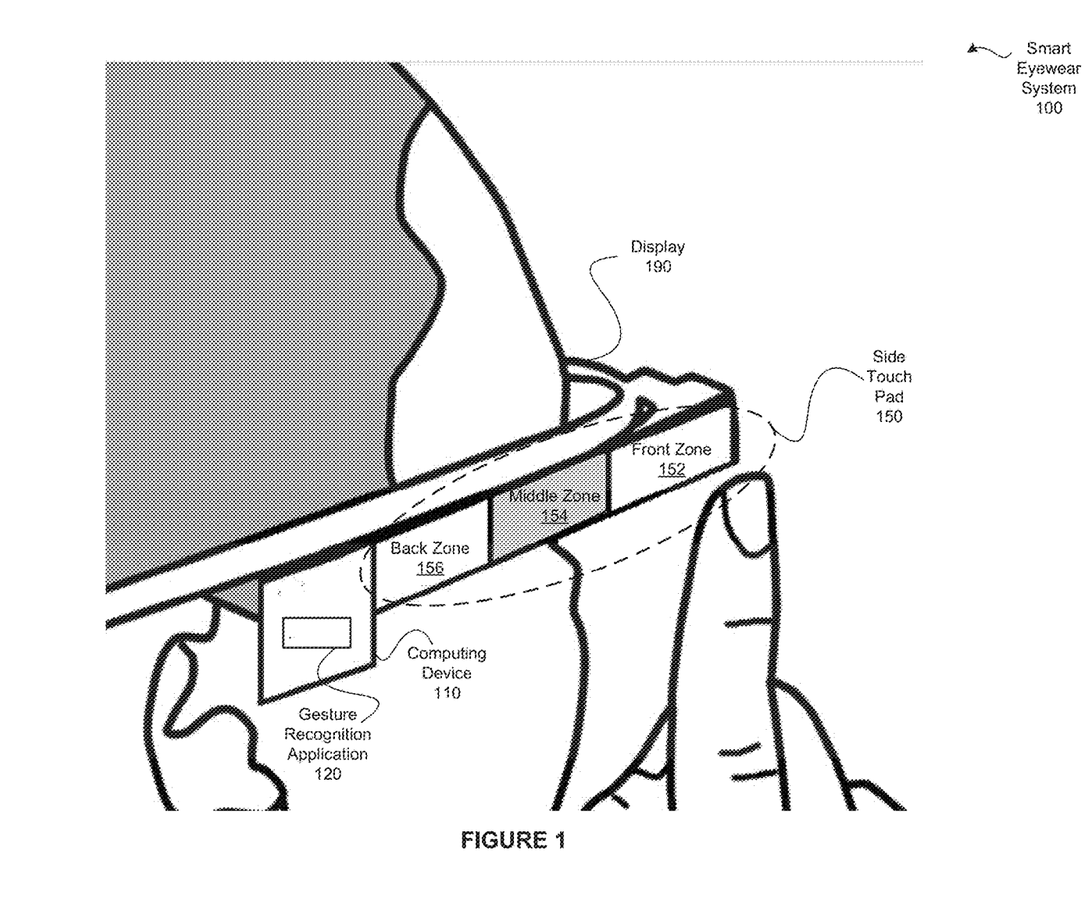
FIG. 1 illustrates a smart eyewear system configured to implement one or more aspects of the present invention.

FIG. 1 illustrates a smart eyewear system 100 configured to implement one or more aspects of the present invention. As shown, the smart eyewear system 100 includes, without limitation, a computing device 110, a display 190, and a side touch pad 150. The computing device 110, the display 190, and the side touch pad 150 form an integrated unit referred to herein as "smart eyewear." In alternate embodiments, the smart eyewear system 100 may be replaced with any system that includes any type of wearable device and is configured to implement one or more aspects of the present invention. Further, any number of the computing device 110, the side touch pad 150, and the display 190 may be implemented independently of the other components, and any number of the components may be mounted on the smart eyewear. In some embodiments, additional components may be mounted on the smart eyewear. For example, in some embodiments a camera may be integrated into the smart eyewear.

The computing device 100, the side touch pad 150, and the display 190 may communicate in any technically feasible fashion. In some embodiments, any combination of the computing device 100, the side touch pad 150, and the display 190 may exchange data over one or more wired connections. In other embodiments, any combination of the computing device 100, the side touch pad 150, and the display may implement a wireless communications protocol, such as Bluetooth. In yet other embodiments, communication paths interconnecting any number of the computing device 110, the side touch pad 150, and the display 190 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different components may use different protocols, as is known in the art.

The smart eyewear system 100 may include any number of the computing devices 110 configured with any number (including zero) of processing units (CPUs and/or GPUs), memory units, etc. The computing device 110 may be implemented in any technically feasible fashion. For example, the computing device 100 could be integrated with connection circuitry on a single chip and mounted to the side of the smart eyewear. In another example, the computing device 100 could be implemented within a smart phone and could be configured to communicate wirelessly with the smart eyewear.

In operation, the computing device 110 receives input user input information from input devices, such as the side touch pad 150, issues commands that control and coordinate the operations of the smart eyewear system 100, and transmits images to the display 190. The display 190 may be any conventional cathode ray tube, liquid crystal display, light-emitting diode display, or the like. Notably, the display 190 is typically integrated into the smart eyewear in close proximity to the head of the user. For example, the display 190 could be implemented as an optical head-mounted display, a heads-up display, and so forth.

The side touch pad 150 enables users to provide input to the smart eyewear system 100 using gestures that are typically performed using one or more fingers. Such gestures may include swipes, taps, and the like. In general, a gesture recognition application 120 included in the smart eyewear system 100 and implemented within the computing device 110, maps received gestures into other forms of input data that are amenable to computer processing, such as textual input. In particular, the gesture recognition application 120 maps sequences of gestures entered via the side touch pad 150 to alphabetic characters. In alternate embodiments, the gesture recognition application 120 may perform any number and type of operations that enable the gesture recognition application 120 to translate one or more gestures into any form of input data.

Typically, to enable users to don and interact with the smart eyewear in an unobtrusive manner, the side touch pad 150 is implemented within a relatively small form factor that constrains the type of gestures that are easily performed via the side touch pad 150. In particular, diagonal swipes are often difficult to execute properly via the side touch pad 150. For this reason, the gesture recognition application 120 is configured to limit the number of types of meaningful gestures that may be performed via the side touch pad 150. More specifically, the gesture recognition application 120 is configured to map combinations of vertical swipes, horizontal swipes, and taps to alphabetic characters and to disregard other gestures, such as diagonal swipes. In general, as referred to herein, the gesture recognition application 120 defines an "encoding" of gestures to items and then performs "gesture mapping" operations to translate gestures to corresponding items based on the encoding.

As persons skilled in the art will recognize, a naïve one-to-one encoding of user-friendly gestures to characters may unacceptably limit the number of unique characters that the gesture recognition application 120 is configured to translate. For example, if the gesture recognition application 120 were to implement a one-to-one encoding of the five acceptable gestures to characters, then the gesture recognition application 120 would only support five characters. Accordingly, to provide a unique encoding for each alphabetic character, the gesture recognition application 120 is configured to encode each alphabetic character into a sequence of two gestures and to distinguish vertical gestures based on the location of the vertical gesture within the side touch pad 150.

More specifically, the gesture recognition application 120 maps a first gesture to a set of three characters, referred to herein as a "triplet," and a second gesture to a specific character within the triplet. To facilitate location-based differentiation of gestures, the gesture recognition application 120 divides the side touch pad 150 into three separate zones: a front zone 152, a middle zone 154, and a back zone 156. As shown, because the width of the side touch pad 150 is longer than the height of the side touch pad 150, to optimize gesture entry, each of the front zone 152, the middle zone 154, and the back zone 156 spans a different portion of the width of the side touch pad 150.

In operation, the gesture recognition application differentiates between vertical gestures in a zone-specific manner. For instance, the gesture recognition application 120 distinguishes between an upward gesture performed within the front zone 152 and an upward gesture performed within the back zone 156. By contrast, the gesture recognition application 120 interprets horizontal gestures and taps in a simpler, zone-agnostic manner. For instance, the gesture recognition application 120 does not distinguish between a tap performed within the front zone 152 and a tap performed within the back zone 156.

In alternate embodiments, the gesture recognition application 120 may divide the side touch pad 150 into any number of sizes of zones. In general, the gesture recognition application 120 may consider any type of gestures to be zone-agnostic and any type of gestures to be zone-specific in any combination and based on any number and type of ergonomic considerations. In some embodiments, to provide additional guidance to the user, one or more of the back zone 156, the middle zone 154, and the front zone 152 may include a tactile feature that enables easy identification. For example, the middle zone 154 of the side touch pad 150 could include a strip of tape or could provide a different tactile sensation than the back zone 156 and/or the front zone 152.

In alternate embodiments, the gesture recognition application 120 may be configured to accept any type of gestures in any combination and define encodings based on the accepted gestures. For example, the gesture recognition application could be configured to encode phone numbers as gestures entered using two fingers in unison. In some embodiments, upon receiving unsupported gestures, the gesture recognition application 120 is configured to ignore or perform error resolution operations instead of attempting to map the gestures to characters.

Mapping Gestures

Figure 2:
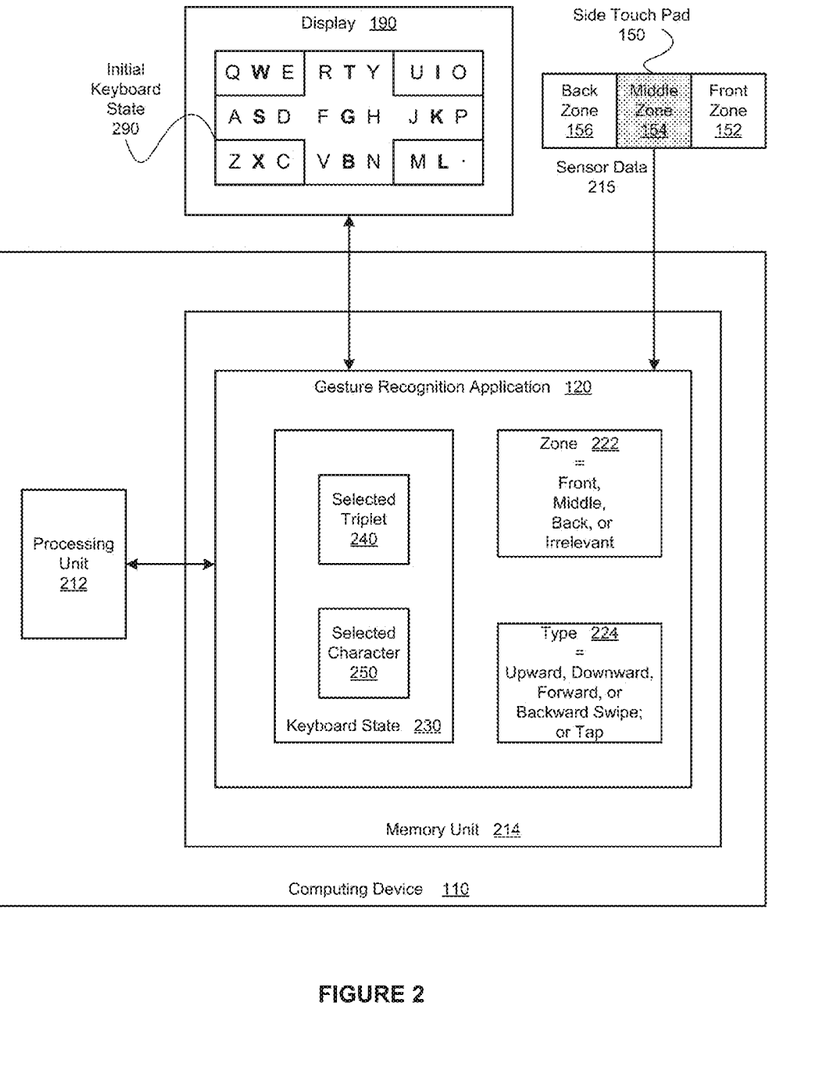
FIG. 2 is a more detailed illustration of the computing device and gesture recognition application of FIG. 1, where the gesture recognition application is configured to enable text input via the side touch pad, according to one embodiment of the present invention.

FIG. 2 is a more detailed illustration of the computing device 110 and the gesture recognition application 120 of FIG. 1, where the gesture recognition application 120 is configured to enable text input via the side touch pad 150, according to one embodiment of the present invention. As shown, the gesture recognition application 120 is included in a memory unit 214 of the computing device 110 and executes on a processing unit 212 of the computing device 110. In alternate embodiments, the memory unit 214 may be replaced with an external storage unit, such as an optical storage device. The processing unit 212 may be implemented in any technically feasible fashion and may incorporate circuitry optimized for graphics and video processing, including, for example, video output circuitry.

As shown, the gesture recognition application 120 includes, without limitation, a keyboard state 230, a zone 222, and a type 224. The gesture recognition application 120 maintains the keyboard state 230 as a snap-shot in time of the mapping process. The keyboard state 230 includes, without limitation, a selected triplet 240 and a selected character 250. Initially, the gesture recognition application 120 sets the selected triplet 240 and the selected character 250 to reflect an unselected state (e.g., a NULL value) and transmits an initial keyboard state 290 to the display 190. The initial keyboard state 290 is a graphical representation of the keyboard state 230 that prompts the user to begin the process of text entry via gestures.

The gesture recognition application 120 is configured to leverage a user's spatial memory of the common "QWERTY" keyboard layout to encode each alphabetic character into two gestures—a first gesture that selects a triplet and a second gesture that selects a character within the triplet. As part of implementing this triplet-based approach to text entry, the gesture recognition application 120 implements a modified QWERTY keyboard. To generate the modified QWERTY keyboard, the gesture recognition application 120 partitions the alphabetic characters into triplets in a uniform manner across three rows, based on the relative positions of the characters included in the core rows of the standard QWERTY keyboard. In particular, the gesture recognition application 120 shifts the locations of the characters "P" and "L" and includes a period character in the final triplet. In this fashion, the gesture recognition application 120 maps the twenty-six alphabetic characters along with the period character into three rows, where each row includes three triplets. To enable the user to easily perform the gestures required for successful text entry, the initial keyboard state 290 reflects the layout of the modified QWERTY keyboard.

Since diagonal swipes are relatively difficult to perform via the side touch pad 150, the gesture recognition application 120 does not include diagonal gestures in the encodings that the gesture recognition application 120 defines for mapping a first gesture to the selected triplet 240. Instead, the gesture recognition application 120 relies on zone selection in conjunction with vertical gestures to define unique encodings for each triplet. In operation, if the first gesture is an upward gesture or a downward gesture, then the gesture recognition application 120 maps the gesture to the selected triplet 240 based on the zone of the first gesture (i.e., the zone in which the first gesture is performed). By contrast, if the first gesture is a forward swipe, a backward swipe, or a tap, then the gesture recognition application 120 maps the first gesture to the selected triplet 240 without regard for the zone(s) of the first gesture. The comprehensive, "hybrid" entry scheme defined by the gesture recognition application to unambiguously map each supported first gesture to a unique triplet is described in greater detail below in the description of FIG. 3. In some embodiments, to emphasize the lack of diagonal gestures, the gesture recognition application 120 highlights the corner triplets included in the initial keyboard state 290.

After displaying the initial keyboard state 290 and receiving sensor data 215 corresponding to the first gesture from the side touch pad 150, the gesture recognition application 120 determines the type 224 of the first gesture based on the sensor data 215. The gesture recognition application 120 may apply any combination of gesture recognition techniques to the sensor data 125 to classify the first gesture as an upward swipe, a downward swipe, a forward swipe, a backward swipe, or a tap. If the gesture recognition application 120 determines that the type 224 is an upward swipe or a downward swipe (i.e., a zone-specific first gesture), then the gesture recognition application 120 determines the zone 222 of the first gesture based on the location of the first gesture as per the sensor data 215. The gesture recognition application 120 then maps the first gesture to the selected triplet 240 based on the type 224 and the zone 222. By contrast, if the gesture recognition application 120 determines that the type 222 is a forward swipe, a backward swipe, or a tap (i.e., a zone-agnostic first gesture), then the gesture recognition application 120 maps the first gesture to the selected triplet 240 based on the type 224—without determining the zone 222. In alternate embodiments, if the gesture recognition application 120 determines that the gesture is zone-agnostic, then the gesture recognition application 120 may set the zone 222 to a value that indicates that the location of the first gesture is irrelevant.

After updating the selected triplet 240, the gesture recognition application 120 transmits a graphical representation of the keyboard state 230 to the display 190. The gesture recognition application 120 may generate the graphical representation of the keyboard state 230 in any technically feasible fashion and may include any number of visual effects to provide feedback to, prompt, and/or guide the user. For example, after updating the selected triplet 240, the gesture recognition application 120 could generate a graphical representation of modified QWERTY keyboard layout that highlights the selected triplet 240. Notably, the second gesture maps to one of the three characters included in the selected triplet 240, and the horizontal layout of the selected triplet 240 intuitively maps to horizontal swipes and taps. Accordingly, the gesture recognition application 120 defines a zone-agnostic entry process for the second gesture that limits the acceptable gestures to a forward swipe, a backward swipe, and a tap.

Upon receiving the sensor data 215 corresponding to a second gesture, the gesture recognition application 120 determines the type 224. Based on the type 224, the gesture recognition application sets the selected character 250 to one of the three characters included in the selected triplet 240, thereby setting a final keyboard state. The comprehensive, zone-agnostic entry scheme defined by the gesture recognition application 120 to unambiguously map each supported second gesture to a unique character within the selected triplet 240 is described in greater detail below in the description of FIG. 4.

The gesture recognition application 120 then transmits the selected character 250 to any client applications, generates a graphical representation of the keyboard state 230 that highlights the selected character 245, and transmits this graphical representation to the display 190. Subsequently, to facilitate the entry of additional characters, the gesture recognition application 120 sets the selected triplet 240 and the selected character 250 to reflect unselected states (e.g., NULL values) and transmits the initial keyboard state 290 to the display 190.

In alternate embodiments, the gesture recognition application 120 may be configured set the keyboard state 230 based on other gestures and/or actions. For example, in some embodiments, the gesture recognition application 120 may be configured to restore the keyboard to an initial, undefined state after detecting a two-second timeout. The gesture recognition application 120 may encode other combinations of gestures and/or actions to additional functions. For example, the gesture recognition application 120 could map a double-swipe down-left to a character deletion operation, a double-swipe down-right to a space character, and/or a double-swipe up to trigger a switch to a symbols and numbers keyboard.

Figure 3:
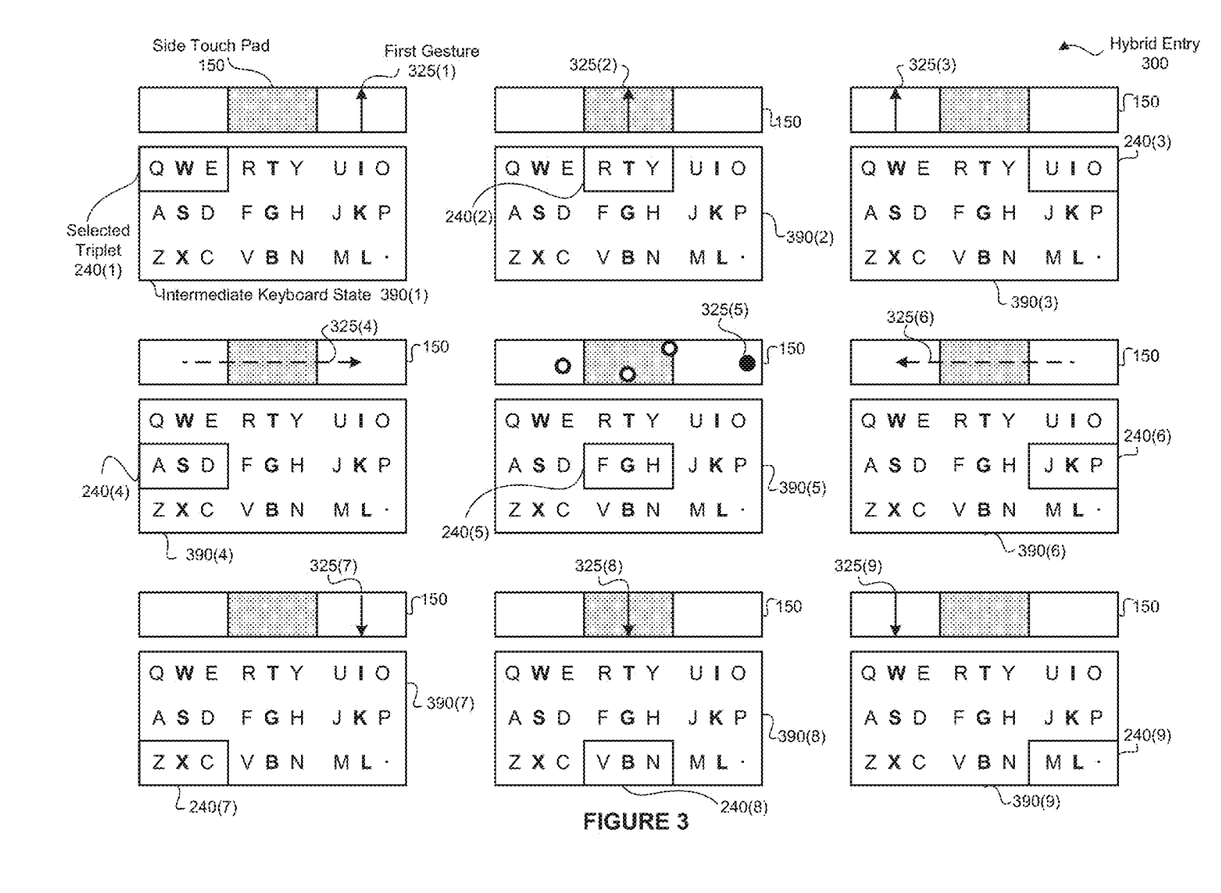
FIG. 3 is a conceptual diagram illustrating the results of hybrid entry operations via the side touch pad of FIG. 1, according to various embodiments of the present invention.

FIG. 3 is a conceptual diagram illustrating the results of hybrid entry operations 300 via the side touch pad 150 of FIG. 1, according to various embodiments of the present invention. As shown, nine first gestures 325(1)-325(9) are depicted as entered via the side touch pad 150. For each of the first gestures 325, a mapping to a selected triplet 240 and a graphical representation of the resulting keyboard state 230, labelled as an intermediate keyboard state 390, are depicted.

In operation, upon receiving the sensor data 215 corresponding to the first gesture 325, the gesture recognition application 120 maps the first gesture 325 to the selected triplet 240 based on the type 224 of the first gesture 325. Further, if the type 224 of the first gesture 325 is either an upward or a downward swipe, then the gesture recognition application 120 maps the first gesture 325 to one of the triplets that correspond to a corner of the initial keyboard state 290.

As shown, the first gesture 325(1) is an upward swipe that is entered via the front zone 152 included in the side touch pad 150. The gesture recognition application 120 maps the first gesture 325(1) based on both the type 224 and the zone 222 to the selected triplet 240(1) "QWE." Subsequently, the gesture recognition application 120 generates the intermediate keyboard state 390(1) that includes the keyboard layout with the selected triplet 240(1) "QWE" highlighted.

The first gesture 325(2) is an upward swipe that is entered via the middle zone 154 included in the side touch pad 150. The gesture recognition application 120 maps the first gesture 325(2) based on both the type 224 and the zone 222 to the selected triplet 240(2) "RTY." Subsequently, the gesture recognition application 120 generates the intermediate keyboard state 390(2) that includes the keyboard layout with the selected triplet 240(2) "RTY" highlighted.

The first gesture 325(3) is an upward swipe that is entered via the back zone 156 included in the side touch pad 150. The gesture recognition application 120 maps the first gesture 325(3) based on both the type 224 and the zone 222 to the selected triplet 240(3) "UIO." Subsequently, the gesture recognition application 120 generates the intermediate keyboard state 390(3) that includes the keyboard layout with the selected triplet 240(3) "UIO" highlighted.

As shown, the first gesture 325(4) is a forward swipe that is initiated in any zone and may terminate in any zone included in the side touch pad 150. For example, the forward swipe may initiate and terminate in the back zone 256, the forward swipe may initiate in the middle zone 254 and terminate in the front zone 252, and so forth. The gesture recognition application 120 maps the first gesture 325(1) based the type 224 "forward swipe"—irrespective of the zone(s)—to the selected triplet 240(4) "ASD." Subsequently, the gesture recognition application 120 generates the intermediate keyboard state 390(4) that includes the keyboard layout with the selected triplet 240(4) "ASD" highlighted.

The first gesture 325(5) is a tap that is entered in any zone included in the side touch pad 150 and depicted as a filled circle. For explanatory purposes, some other first gestures 325 that are equivalent to the first gesture 325(5) with respect to the gesture recognition application 120 are depicted as hollow circles. The gesture recognition application 120 maps the first gesture 325(5) based the type 224 "tap"—irrespective of the zone—to the selected triplet 240 (5) "FGH." Subsequently, the gesture recognition application 120 generates the intermediate keyboard state 390(5) that includes the keyboard layout with the selected triplet 240(5) "FGH" highlighted.

The first gesture 325(6) is a backward swipe that is initiated in any zone and may terminate in any zone included in the side touch pad 150. For example, the backward swipe may initiate and terminate in the back zone 256, the backward swipe may initiate in the front zone 252 and terminate in the back zone 256, and so forth. The gesture recognition application 120 maps the first gesture 325(6) based the type 224 "backward swipe"—irrespective of the zone(s)—to the selected triplet 240(6) "JKP." Subsequently, the gesture recognition application 120 generates the intermediate keyboard state 390(6) that includes the keyboard layout with the selected triplet 240(6) "JKP" highlighted.

As shown, the first gesture 325(7) is a downward swipe that is entered via the front zone 152 included in the side touch pad 150. The gesture recognition application 120 maps the first gesture 325(7) based on both the type 224 and the zone 222 to the selected triplet 240(7) "ZXC." Subsequently, the gesture recognition application 120 generates the intermediate keyboard state 390(7) that includes the keyboard layout with the selected triplet 240(7) "ZXC" highlighted.

The first gesture 325(8) is a downward swipe that is entered via the middle zone 154 included in the side touch pad 150. The gesture recognition application 120 maps the first gesture 325(8) based on both the type 224 and the zone to the selected triplet 240(8) "VBN." Subsequently, the gesture recognition application 120 generates the intermediate keyboard state 390(8) that includes the keyboard layout with the selected triplet 240(8) "VBN" highlighted.

The first gesture 325(9) is a downward swipe that is entered via the back zone 156 included in the side touch pad 150. The gesture recognition application 120 maps the first gesture 325(9) based on both the type 224 and the zone 222 to the selected triplet 240(9) "ML." Subsequently, the gesture recognition application 120 generates the intermediate keyboard state 390(9) that includes the keyboard layout with the selected triplet 240(9) "ML" highlighted.

As FIG. 3 illustrates, the gesture recognition application 120 provides a user-intuitive and ergonomic set of first gestures 325 based on the hybrid entry 300 performed via the side touch pad 150. Notably, by leveraging different zones, the gesture recognition application 120 eliminates the need for gestures such as diagonal swipes that are relatively difficult to perform via the side touch pad 150 without limiting the total number of triplets that may be selected via the set of first gestures 325.

Figure 4:
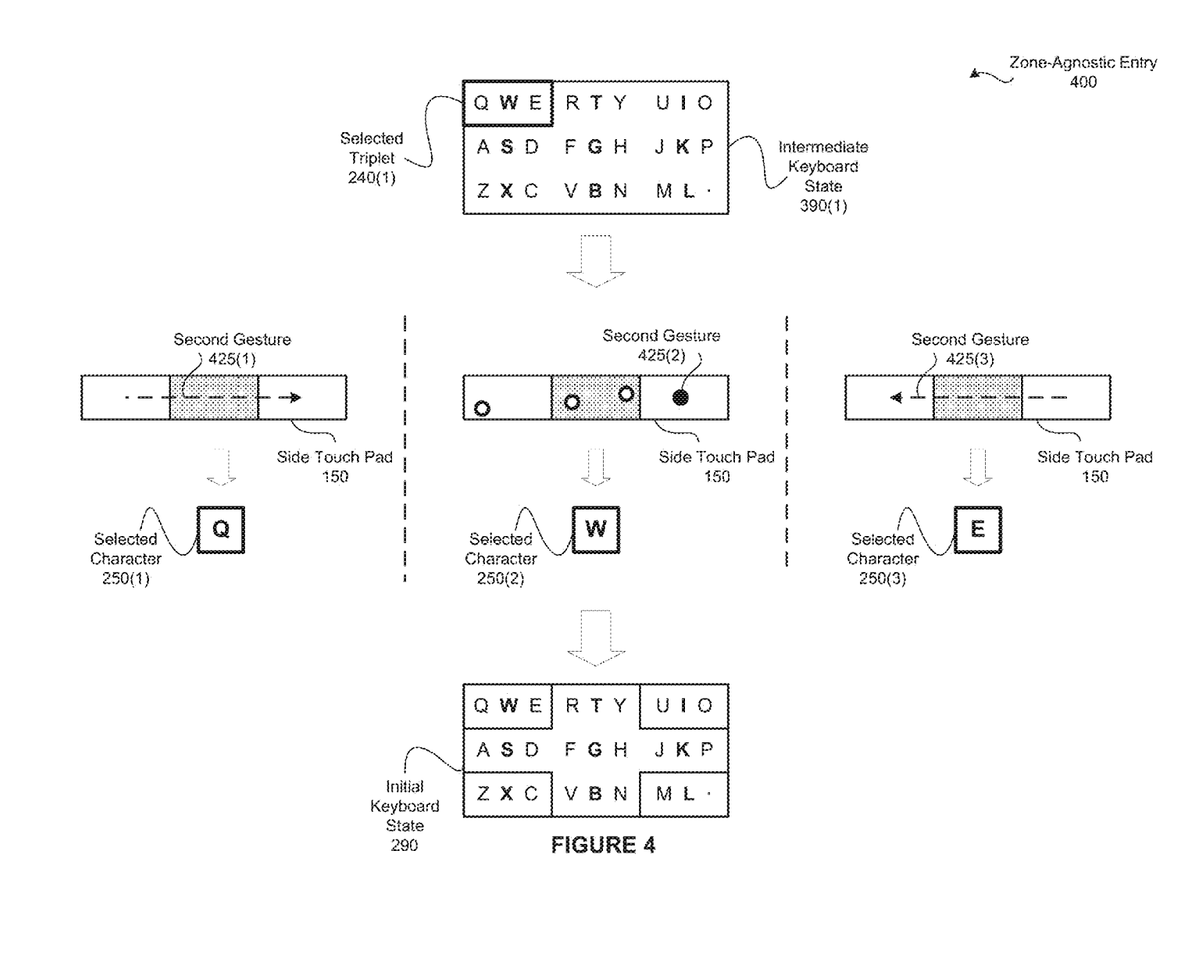
FIG. 4 is a conceptual diagram illustrating the results of zone-agnostic entry operations via the side touch pad of FIG. 1, according to various embodiments of the present invention.

FIG. 4 is a conceptual diagram illustrating the results of zone-agnostic entry 400 operations via the side touch pad 150 of FIG. 1, according to various embodiments of the present invention. For explanatory purposes, the context of FIG. 4 is that, the gesture recognition application 120 maps the first gesture 325(1) to the selected triplet 240(1) "QWE" and then generates the intermediate keyboard state 390(1) that includes the keyboard layout with the selected triplet 240(1) "QWE" highlighted.

After transmitting the intermediate keyboard state 390(1) to the display 190, the gesture recognition application 120 receives the sensor data 215 corresponding to the second gesture 425. In operation, the sensor data 215 reflects that the first gesture 325 is followed by a particular zone-agnostic second gesture 425—a forward swipe 425(1), a tap 425(2), or a backward swipe 425(3). For explanatory purposes, the three meaningful second gestures 425(1)-425(3) are depicted as entered via the side touch pad 150 and, for each of the second gestures 425, a mapping to a corresponding selected character 250 is depicted. Since there are three characters included in the selected triplet 240, the gesture recognition application 120 is configured to map three second gestures 425 to the selected character 250 and to disregard any extraneous sensor data 215.

In alternate embodiments, the gesture recognition application 120 may be configured to perform any type of checking on the sensor data 215 and implement any type of error resolution mechanisms, such as displaying an "invalid gesture" notification via the display 190. In general, the gesture recognition application 120 may perform any amount of error checking and/or resolution operations in conjunction with the hybrid entry 300 associated with the first gesture 235 and/or the zone-agnostic entry 400 associated with the second gesture 425.

As shown, if the second gesture 425(1) is a forward swipe 425(1), then the gesture recognition application 120 maps the second gesture 425(1) to the selected character 250(1) "Q" based on the type 224 of the second gesture 425(1) and the selected triplet 240(1). Notably, the gesture recognition application 120 disregards the zone(s) in which the second gesture 425(1) is performed while mapping the second gesture 425(1) to the selected character 250(1).

If, however, the second gesture 425(2) is a tap, then the gesture recognition application 120 maps the second gesture 425(2) to the selected character 250(2) "W" based on the type 224 of the second gesture 425(2) and the selected triplet 240(1). The tap may be entered in any zone included in the side touch pad 150 and is depicted as a filled circle. For explanatory purposes, some other second gestures 425 that are equivalent to the second gesture 425(2) with respect to the gesture recognition application 120 are depicted as hollow circles.

If, however, the second gesture 425(3) is a backward swipe 425(3), then the gesture recognition application 120 maps the second gesture 425(3) to the selected character 250(3) "E" based on the type 224 of the second gesture 425(3) and the selected triplet 240(1). Notably, the gesture recognition application 120 disregards the zone(s) in which the second gesture 425(3) is performed while mapping the second gesture 425(3) to the selected character 250(3).

As shown, after determining the selected character 250, the gesture recognition application 120 transmits the initial keyboard state 290 to the display 190, thereby enabling the user to easily perform the next first gesture 325. In general, the gesture recognition application 120 may be configured to perform any number of operations designed to increase the usability of the side touch pad 150 and guide the hybrid entry 300 of the first gesture 235 and the zone-agnostic entry 400 of the second gesture 425. In particular, the gesture recognition application 120 may be configured to provide any number and type of visual prompts via the display 190 at anytime. For example, in some embodiments, after mapping the second gesture 425, the gesture recognition application 120 may transmit the selected character 250(0) "Q," 250(1) "W," or 250(2) "E" to the display 190 as an independent character or as part of one or more characters (e.g., the selected triplet 240(1) or a larger portion of the keyboard).

As illustrated in FIGS. 3 and 4, by providing an intuitive set of gestures for entry via the side touch pad 150 and visual prompts via the display 190, the gesture recognition application 120 enables a user to efficiently convey textual input to the smart eyewear system 100. In alternate embodiments, the gesture recognition application 120 may map the sensor data 215 in any technically feasible fashion to any form of input data. For example, in some embodiments, the gesture recognition application 120 may be configured to reverse the mappings of the front zone 152 and the back zone 156 (e.g., the gesture recognition application 120 could map an upward swipe in the back zone 156 to the selected triplet 240 "QWE"). In yet other embodiments, the gesture recognition application 120 may be configured to provide customized mapping of any type and/or sequence of gestures to any type of input. For example, the gesture recognition application 120 could be dynamically configured to map a compound gesture that includes multiple taps and/or swipes in any number of zones to a particular Internet address.

Interacting with Smart Eyewear

Figure 5:
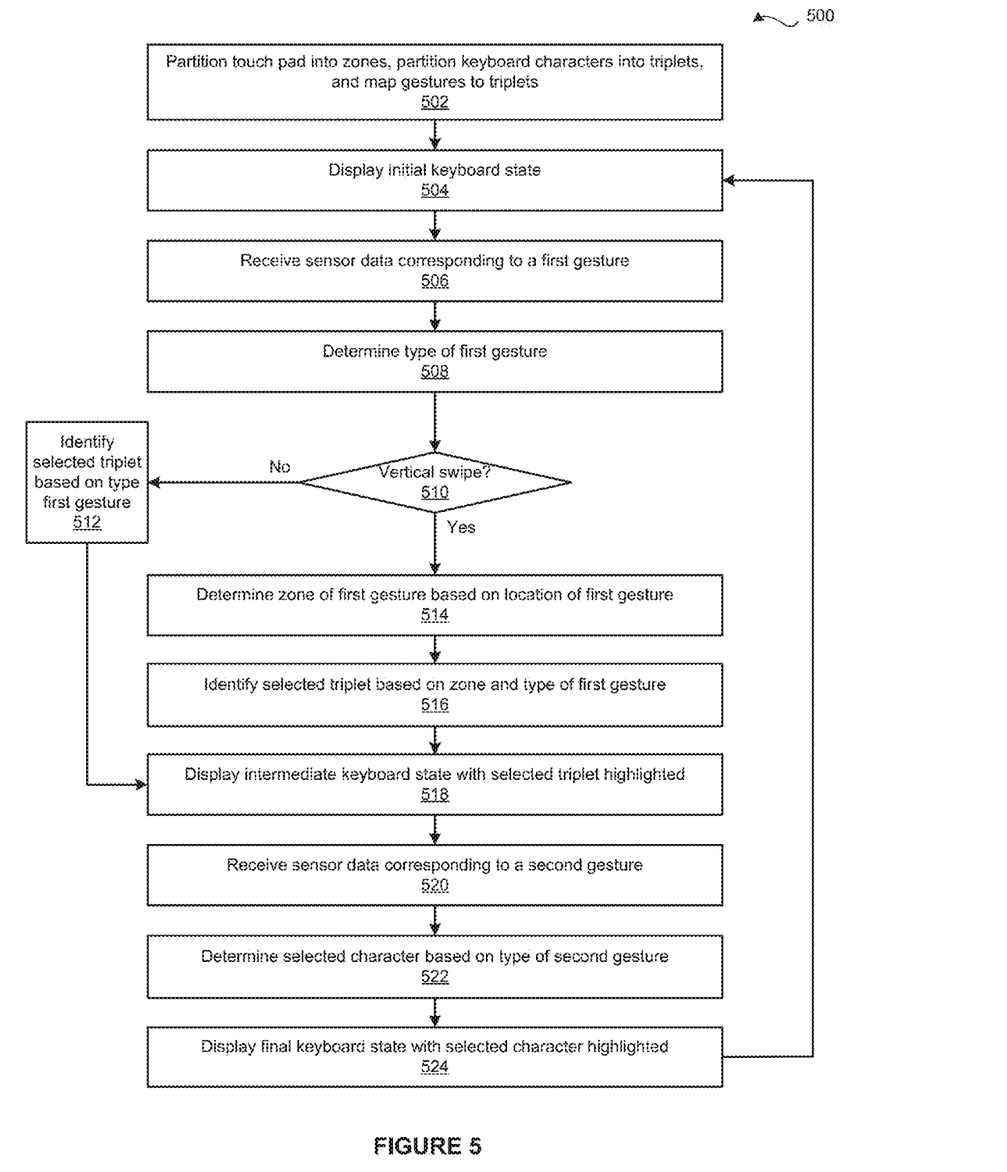
FIG. 5 is a flow diagram of method steps for interacting with a wearable device, according to various embodiments of the present invention.

FIG. 5 is a flow diagram of method steps for interacting with a wearable device, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the gesture recognition application 120 partitions the side touch pad 150 into three zones: the front zone 152, the middle zone 154, and the back zone 156. More specifically, because the height of the side touch pad 150 typically exceeds the width of the side touch pad 150, the gesture recognition application 120 divides the horizontal span of the side touch pad 150 into the front zone 152, the middle zone 154, and the back zone 156. In some embodiments, to provide additional guidance to the user, one or more of the front zone 152, the middle zone 154, and the back zone 156 may include a tactile feature that enables easy identification. For example, the middle zone 154 of the side touch pad 150 may include a strip of tape or may provide a different tactile sensation than the back zone 156 and/or the front zone 152. In alternate embodiments, the gesture recognition application 120 may partition the side touch pad 150 into any number of zones based on any number of ergonomic considerations. Further, the side touch pad 150 may include any type of features, including none, that may distinguish between the zones.

As part of step 502, the gesture recognition application 120 also partitions the keyboard characters into triplets, and then leverages the zones to map user-friendly gestures to the triplets. To exploit the familiar layout of the QWERTY keyboard, the gesture recognition application 120 bases the mappings on the relative positions of the alphabetic characters within the three core rows of the QWERTY layout. To divide the alphabetic characters into triplets in a uniform manner across the three rows, the gesture recognition application 120 shifts the locations of the characters "P" and "L" and includes a period character in the final triplet. In this fashion, the gesture recognition application 120 maps the twenty-six alphabetic characters along with the period character into three rows, where each row includes three triplets. Further, because diagonal swipes are relatively difficult to perform via the side touch pad 150, the gesture recognition application 120 does not include diagonal gestures in the set of user-friendly gestures. Instead, the gesture recognition application relies on zone selection to provide a set of user-friendly gestures that is rich enough to support unique mappings for each triplet.

At step 504, the gesture recognition application 120 transmits the initial keyboard state 290 to the display 190. In some embodiments, to guide the hybrid entry 300 associated with the first gesture 325, the gesture recognition application 120 highlights the triplets in each corner of the modified QWERTY keyboard (i.e., "QWE," "UIO," "ZXC," and "ML"). In this fashion, the initial keyboard state 290 indirectly emphasizes that selecting a highlighted triplet requires a vertical gestured in the front zone 152 or the back zone 156 of the side touch pad 150.

At step 506, the gesture recognition application 120 receives the sensor data 215 corresponding to the first gesture 325. The sensor data 215 may include any amount and type of information related to the side touch pad 190 that enables the gesture recognition application 120 to determine the type 224 and the zone 222 of the first gesture 325. For example, the sensor data 215 could include starting and ending coordinates. At step 508, the gesture recognition application 120 determines the type 224 of the first gesture 325. More specifically, the gesture recognition application 120 applies one or more gesture recognition algorithms to the sensor data 215 to classify the first gesture 325 as an upward swipe, a downward swipe, a forward swipe, a backward swipe, or a tap.

At step 510, the gesture recognition application 120 determines whether the first gesture 325 is a vertical swipe (i.e., either an upward swipe or a downward swipe). If, at step 510, the gesture recognition application 120 determines that the first gesture 325 is not a vertical swipe, then the gesture recognition application 120 considers the first gesture 325 to be zone-agnostic, and the method 500 proceeds to step 512. At step 512, the gesture recognition application 120 determines the selected triplet 240 based on the type 224 of the first gesture 325. Notably, the gesture recognition application 120 determines the selected triplet 240 without determining the zone(s) 222 associated with the first gesture 325. The method 500 then proceeds directly to step 518.

If, however, at step 510, the gesture recognition application 120 determines that the first gesture 325 is a vertical swipe, then the gesture recognition application 120 considers the first gesture 325 to be zone-specific, and the method 500 proceeds directly to step 514. At step 514, the gesture recognition application 120 determines the zone 222 associated with the first gesture 325 based on the sensor data 215. More specifically, the gesture recognition application 120 sets the zone 222 to one of the front zone 152, the middle zone 154, or the back zone 156 based on the location of the first gesture 325. At step 516, the gesture recognition application 120 determines the selected triplet 240 based on both the zone 222 and the type 224 of the first gesture 325.

At step 518, the gesture recognition application 120 generates the intermediate keyboard state 390 and transmits the intermediate keyboard state 390 to the display 190. The intermediate keyboard state 390 may include any type of feedback that distinguishes the selected triplet 240. For example, the intermediate keyboard state 390 could include a zoomed-in view of the selected triplet 240 superimposed on the entire keyboard layout. Configuring the intermediate keyboard state 390 in such a manner not only prompts the user to properly perform the second gesture 425 to select the current character, but also assists the user in planning the next first gesture 325 to select the next triplet.

At step 520, the gesture recognition application 120 receives the sensor data 215 corresponding to the second gesture 425. The sensor data 215 may include any amount and type of information related to the side touch pad 190 that enables the gesture recognition application 120 to determine the type 224 of the second gesture 425. At step 522, the gesture recognition application 120 determines the type of the second gesture 425. More specifically, the gesture recognition application 120 applies one or more gesture recognition algorithms to the sensor data 215 to classify the second gesture 425 as a forward swipe, a backward swipe, or a tap.

At step 522, the gesture recognition application 120 determines, based on the type 224 of the second gesture 425, which one of the three characters included in the selected triplet 240 is the selected character 250. At step 524, the gesture recognition application 120 generates a final keyboard state with the selected character 250 highlighted. As part of step 524, the gesture recognition application 120 also conveys the selected character 250 to any number of client applications that receive text-based input via the gesture recognition application 120. The method 500 then returns to step 504 where, to facilitate the hybrid entry 300 of the next first gesture 325, the gesture recognition application 120 transmits the initial keyboard state 290 to the display 190. The guest recognition application 120 continues to cycle through steps 504-524, converting gesture-based input via the side touch pad 250 to the selected characters 250, and thereby facilitating user-friendly interactions with the smart eyewear system 100.

In sum, the disclosed techniques may be used to efficiently interact with wearable devices. In particular, a gesture recognition application enables text entry via a side touch pad included in smart eyewear. In operation, the gesture recognition application divides the side touch pad horizontally into three zones. The gesture recognition application also partitions the characters in a keyboard into nine triplets, where each triplet includes three characters. Guided by the location of the triplets within a standard QWERTY keyboard, the gesture recognition application then associates the top row of triplets with zone-specific upward swipes and the bottom row of triplets with zone-specific downward swipes. Further, the gesture recognition application associates the middle row of triplets with, from left to right across the QWERTY keyboard: a zone-agnostic forward swipe, a zone-agnostic tap, and a zone-agnostic backward swipe. To facilitate text entry, the gesture recognition application configures the smart eyewear to display an initial state of the keyboard delineated by the triplets.

Upon detecting a first gesture via the side touch pad, the gesture recognition application determines whether the first gesture is a vertical gesture. If the first gesture is a vertical gesture, then the gesture recognition application determines the zone of the first gesture based on the location of the initial gesture. The gesture recognition application then selects a triplet based on the zone and the type (either an upward or downward swipe) of the first gesture. If the first gesture is not a vertical gesture, then the gesture recognition application selects the triplet based on the type of the first gesture—the location of the first gesture is irrelevant. The gesture recognition application then configures the smart eyewear to display the selected triplet within the keyboard.

Upon detecting a second gesture via the side touch pad, the gesture recognition application selects one of the three characters included in the selected triplet. Notably, the second gesture is a zone-agnostic forward swipe, a zone-agnostic backward swipe, or a zone-agnostic tap. The gesture recognition application then configures the smart eyewear to redisplay the keyboard in the initial state to facilitate entry of the next character.

Advantageously, partitioning the side touch pad into multiple entry zones enables efficient gesture-based text entry for smart eyewear. More specifically, the zone-based techniques disclosed herein leverage the relatively wider dimension of the side touch pad to provide a comprehensive set of mappings between ergonomic gestures and triplets. In particular, because diagonal swipes are relatively difficult to property execute on the side touch pad, the gesture recognition application maps zone-specific vertical swipes to triplets that are located at the diagonal corners of the keyboard. Notably, the gesture recognition application exploits the side touch pad to provide text-based input without compromising the primary purpose of the smart eyewear—to provide unobtrusive, constant access to information.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for interacting with a wearable device, the method comprising:
    partitioning a touch pad associated with the wearable device into a plurality of zones;
    detecting a first gesture performed via the touch pad;
    in response, determining whether a first gesture type associated with the first gesture is zone-specific; and
    if the first gesture type is zone-specific, then:
        identifying a first zone included in the plurality of zones based on a first location associated with the first gesture, and
        setting a selected input group to equal a first input group included in a plurality of input groups based on the first zone and the first gesture type; and
    if the first gesture type is not zone-specific, then setting the selected input group to equal a second input group included in the plurality of input groups based on the first gesture type.

2. The method of claim 1, further comprising detecting a second gesture performed via the touch pad and, in response, selecting a first item included in the selected input group.

3. The method of claim 2, wherein the selected input group comprises a plurality of characters, and the first item comprises a first character.

4. The method of claim 1, wherein determining whether the first gesture type is zone-specific comprises determining whether the first gesture type comprises a vertical swipe.

5. The method of claim 4, wherein the first gesture type comprises a vertical swipe, and setting the selected input group comprises selecting an input group that is located in a diagonal direction with respect to a center input group included in the plurality of input groups.

6. The method of claim 1, wherein the selected input group comprises one or more characters, and further comprising displaying via a display associated with the wearable device at least a portion of a keyboard that includes the selected input group.

7. The method of claim 1, wherein the first gesture comprises an upward swipe, a downward swipe, a forward swipe, a backward swipe, or a tap.

8. The method of claim 1, wherein a height associated with the touch pad is less than a width associated with the touch pad, and each zone in the plurality of zones spans the height associated with the touch pad and spans a different portion of the width associated with the touch pad.

9. A non-transitory computer-readable storage medium including instructions that, when executed by a processing unit, cause the processing unit to interact with a wearable device by performing the steps of:
    partitioning a touch pad associated with the wearable device into a plurality of zones;
    detecting a first gesture performed via the touch pad;
    in response, determining whether a first gesture type associated with the first gesture is zone-specific; and
    if the first gesture type is zone-specific, then:
        identifying a first zone included in the plurality of zones based on a first location associated with the first gesture, and
        setting a selected input group to equal a first input group included in a plurality of input groups based on the first zone and the first gesture type; and
    if the first gesture type is not zone-specific, then setting the selected input group to equal a second input group included in the plurality of input groups based on the first gesture type.

10. The non-transitory computer-readable storage medium of claim 9, further comprising detecting a second gesture performed via the touch pad and, in response, selecting a first item included in the selected input group.

11. The non-transitory computer-readable storage medium of claim 10, wherein the selected input group comprises a plurality of characters, and the first item comprises a first character.

12. The non-transitory computer-readable storage medium of claim 9, wherein the plurality of input groups comprises nine input groups, and the first input group comprises three characters.

13. The non-transitory computer-readable storage medium of claim 9, wherein determining whether the first gesture type is zone-specific comprises determining whether the first gesture type comprises a vertical swipe.

14. The non-transitory computer-readable storage medium of claim 9, wherein the first gesture comprises an upward swipe, a downward swipe, a forward swipe, a backward swipe, or a tap.

15. The non-transitory computer-readable storage medium of claim 9, wherein the first gesture comprises at least two of an upward swipe, a downward swipe, a forward swipe, a backward swipe, and a tap.

16. A system configured to interact with a wearable device, the system comprising:
    a memory storing a gesture recognition application; and
    a processing unit coupled to the memory, wherein, when executed by the processor, the gesture recognition application configures the processor to:
        partition a touch pad associated with the wearable device into a plurality of zones;
        detect a first gesture performed via the touch pad;
        in response, determine whether a first gesture type associated with the first gesture is zone-specific; and
        if the first gesture type is zone-specific, then:
            identify a first zone included in the plurality of zones based on a first location associated with the first gesture, and
            set a selected input group to equal a first input group included in a plurality of input groups based on the first zone and the first gesture type; and
        if the first gesture type is not zone-specific, then set the selected input group to equal a second input group included in the plurality of input groups based on the first gesture type.

17. The system of claim 16, wherein the gesture recognition application further configures the processing unit to detect a second gesture performed via the touch pad and, in response, select a first item included in the selected input group.

18. The system of claim 17, wherein the selected input group comprises a plurality of characters, and the first item comprises a first character.

19. The system of claim 16, wherein a height associated with the touch pad is less than a width associated with the touch pad, and each zone in the plurality of zones spans the height associated with the touch pad and spans a different portion of the width associated with the touch pad.

20. The system of claim 16, wherein the plurality of zones further includes a second zone, and a tactile sensation associated with the first zone is different than a tactile sensation associated with the second zone.

* * * * *